Feb. 26, 1952 L. S. LAPPIN 2,587,175

LOAD CONTROL SYSTEM FOR ELECTRONIC POWER GENERATORS

Filed June 30, 1948

INVENTOR
LESTER S. LAPPIN
BY Morris L. Rubin
ATTORNEY

Patented Feb. 26, 1952 2,587,175

UNITED STATES PATENT OFFICE 2,587,175

LOAD CONTROL SYSTEM FOR ELECTRONIC POWER GENERATORS

Lester S. Lappin, Pennsauken, N. J., assignor to Radio Corporation of America, a corporation of Delaware Application June 30, 1948, Serial No. 36,073

7 Claims. (Cl. 323—66)

Figure 1:
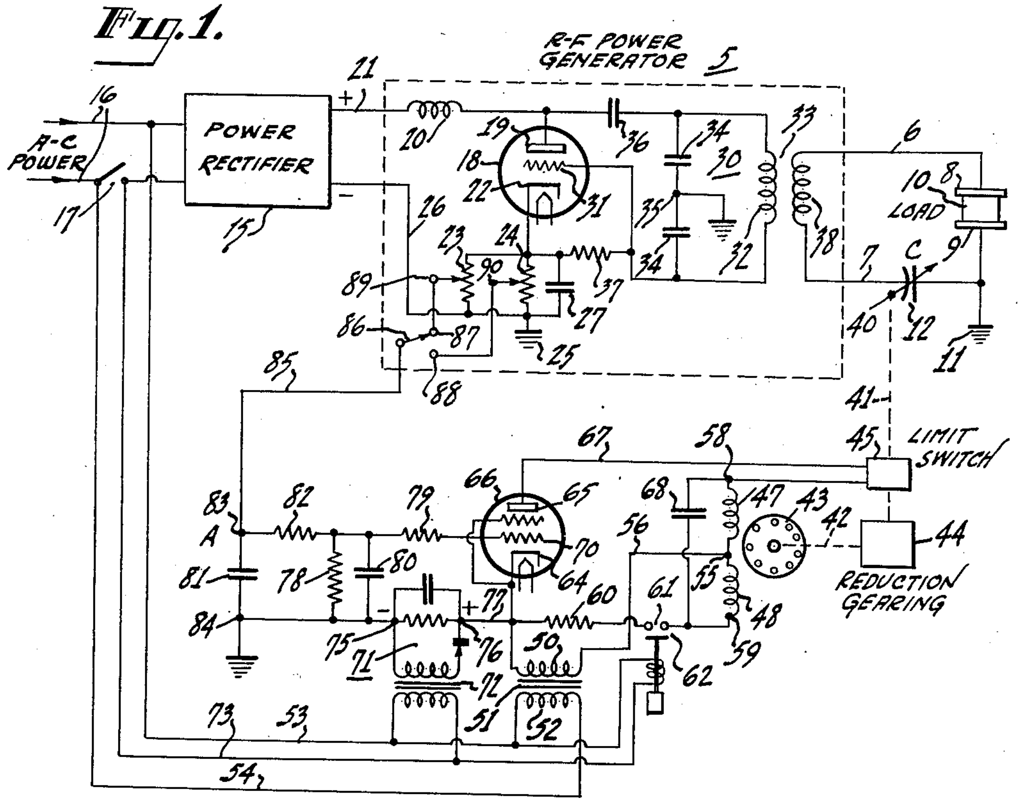

The present invention relates to a load control system for electronic power generators of the type used for R.-F. heating of dielectric materials, and induction heating of metals and the like. Such electronic power generators may embody one or more electronic oscillator tubes and a tunable oscillator circuit from which power is derived for high frequency heating.

It is a primary object of the present invention, to provide an improved load control system for electronic power generators and the like which will maintain the power output substantially constant with varying load impedance.

It is also an object of the invention, to provide an improved load control system for electronic power generators and the like for induction and R.-F. heating application work which operates to maintain the power output substantially constant with varying load impedance at one power level, and which may readily be adjusted to maintain the power output constant with varying load impedance at another power level, whereby different materials may be treated alternately with the same generator and load circuit.

In the dielectric heating of non-conducting materials, such as blocks of thermoplastic dielectric material, rayon yarn and other materials adapted for dielectric heating, the load impedance presented to the electronic power generator or oscillator may vary considerably with variations in a condition of the material, such as temperature, size, density, and moisture content, for example. Since the power dissipated in the load is a function of the load impedance, it is desirable, in order to maintain uniform heating independently of load variables, to provide means for automatically varying or controlling the power applied to the load of work. It is further desirable that the load control means be capable of compensating for changes in impedance which occur during a heating cycle because of increasing temperature and decreasing moisture content of the work body or material being treated.

It is, therefore, a further object of this invention to provide an improved load control system for an electronic power generator, having the desirable features above referred to.

Loads having different characteristics must often be heat treated successively or alternately with constant energy dissipation, and accordingly, it is a still further object of this invention, to provide an improved load control system for R.-F. generators and the like comprising electronic tube oscillators which provides for heating loads having different characteristics and which also provides other desirable control features related thereto.

It may also be considered to be an object of this invention to provide a high frequency electronic power generator system comprising an electronic oscillator tube which operates to maintain the average voltage applied to the load substantially constant independently of changes which may occur in the load impedance.

In carrying the invention into effect, use is made of a variable reactance in the load circuit under control of a reversible motor which is constantly operated alternately in opposite directions in response to changes or variations in the anode current of the oscillation generator or of the voltage applied to the load, or any other suitable operating condition or characteristic of the generator system, whereby the control characteristic may be maintained substantially constant or at a predetermined average value.

It is a further object of the invention, therefore, to provide an automatic load control system for an electronic power generator which may operate to control the matching of the output circuit of the power generator to the load, whereby a predetermined output power may be maintained with variations or changes in load impedance within wide limits.

The novel features that are considered characteristic of the invention are set forth with particularity in the appended claims. The invention, however, both as to its organization and method of operation, as well as additional objects and advantages thereof, will best be understood from the following description of several embodiments thereof when read in connection with the accompanying drawings, in which Figure 1 is a schematic circuit diagram of a load control system for an electronic power generator embodying the invention, Figure 2 is a graph showing a curve indicating an operating characteristic of the system of Figure 1, and Figures 3 and 4 are schematic circuit diagrams of a portion of the circuit of Figure 1 illustrating certain modifications of the invention.

Figures 2, 3, 4:
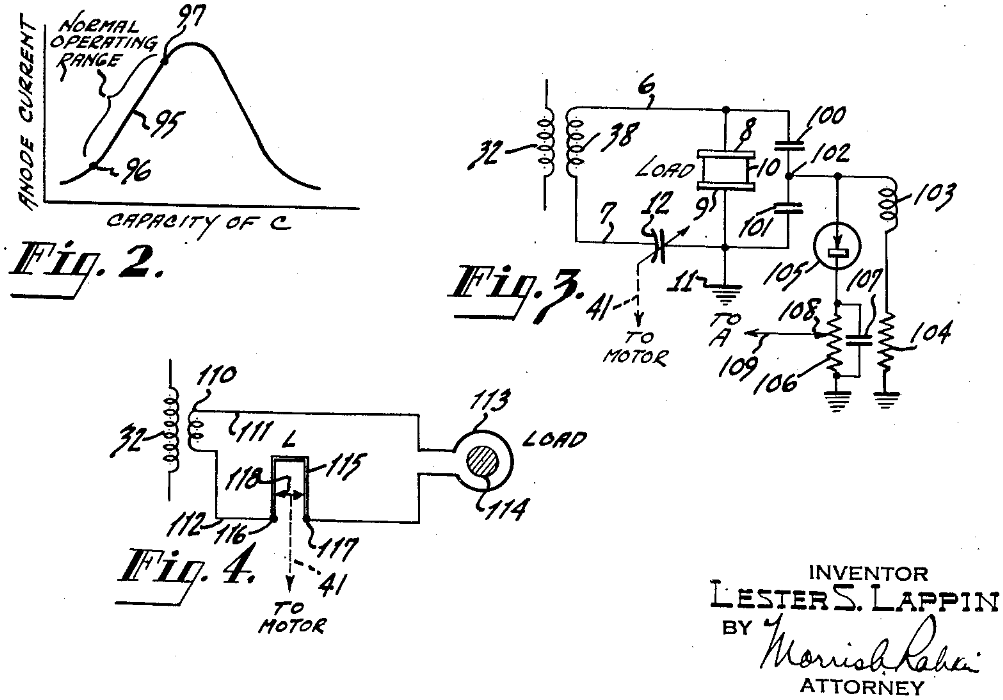

Referring to Figure 1, an R.-F. power generator 5 is provided with a high frequency load or output circuit indicated by output leads 6 and 7 which are connected to electrodes 8 and 9 respectively for applying high frequency power to a body of work material 10 located therebetween. The electrode 9 is connected to ground as indicated at 11, and the application of energy to the load through the output circuit 6—7 is controlled by a series reactance device 12 connected serially in the load circuit between the generator and one of the electrodes, and in the present example is included in the lead 7 as shown.

The R.-F. generator is provided with high voltage anode current or power through a suitable power rectifier indicated at 15, which in turn, is connected with suitable power supply leads 16 through a power switch 17.

The R.-F. power generator comprises an electronic oscillator tube 18 having an anode 19 connected through a suitable choke coil 20 with the high voltage positive supply lead 21 of the power rectifier. The cathode 22 of the oscillator tube 18 is connected through a pair of parallel connected resistance elements 23 and 24 to ground 25 and to the negative supply lead 26 of the power rectifier. A high frequency bypass capacitor 27 is connected in parallel with the resistors 23 and 24.

The oscillator is tuned to a predetermined high frequency such as 40 megacycles, by a tunable tank circuit 30 connected between the anode and the control grid 31. The tuned circuit 30 comprises a primary winding 32 of an output or load coupling transformer 33 and two series connected capacitors 34 providing a shunt tuning capacity for the inductance of the winding 32. A tap point 35 between the capacitors to ground, provides a cathode connection with the tuned circuit. The oscillator anode is coupled to the tuned circuit through a coupling capacitor 36 and the grid is provided with a suitable grid leak resistor 37 connected to the cathode as shown. The power output circuit of the R.-F. power generator comprising the leads 6 and 7 is connected to the secondary 38 of the output transformer 33.

The variable reactance 12 in the load circuit provides a series controlling impedance for varying the application of power or operating voltage to the load, and in the present example is provided by a variable capacitor, the movable control element 40 of which is coupled as indicated by the dotted line 41—42, with the rotor 43 of a reversible electric motor, the connection including a reduction gearing 44 and a limit switch 45, the latter being normally closed, and opening when the variable reactance 12 is operated to one end of its travel or limit, providing maximum impedance reactance, or minimum coupling to the load, that is, minimum capacity, in the present example.

The motor is provided with two operating windings, 47 and 48, by which it is operated in the one or the other direction depending upon which winding is energized. In the present example it may be considered that the winding 48 drives the motor in a direction to increase the capacity of the capacitor 12, thereby increasing the power or voltage applied to the load, and that the winding 47 operates the motor in the opposite direction to decrease the capacity of the capacitor 12, thereby decreasing the power or voltage applied to the load.

The reversing windings 47 and 48 of the motor are energized from a suitable source of operating voltage represented by the secondary 50 of a transformer 51, the primary 52 of which is connected through supply leads 53 and 54 with the main supply lead 16 for the power rectifier, the lead 54 being connected on the input side of the switch 17, whereby the transformer 51 is energized at all times when the apparatus is in operation.

The motor windings 47 and 48 are connected in series-opposing, to a common terminal 55 which is connected through a lead 56 with one side of the secondary 50. The opposite terminal of the secondary 50 is connected through two parallel circuits or paths to the remaining terminals 58 and 59 of the windings. The one path from the secondary 50 includes a series resistor 60, the contacts 61 of the relay 62, and the terminal 59.

The alternate path includes the space path between the cathode 64 and the anode 65 of an electron tube 66, a lead 67, the limit switch 45 and the terminal 58 of the winding 47. An operating capacitor 68 is connected between the terminals 58 and 59 of the motor winding for obtaining the proper phase displacement therein for causing rotation of the rotor, as is well understood. The motor shown represents any suitable reversible motor having a pair of reverse windings such as the windings 47 and 48.

From the foregoing description it will be seen that the motor winding 47 is energized through the lead 56, the space path of the electron tube 66, and the limit switch 45, while the winding 48 is energized through the lead 56, the resistor 60 and the contacts 61 of the relay 62.

The tube 66 is preferably of the grid-controlled gaseous discharge type known commercially as a "Thyratron." This type of tube is responsive to control potentials applied to a control grid 70 to conduct current when the potential of the control grid reaches a predetermined value with respect to the cathode, and thereafter conducts until the current is cut off simultaneously with the reduction of the anode potential to a low value or when it passes through zero as with the present A.-C. supply through the transformer 51. In the present example, the tube 66 is arranged to be cut off and to be non-conducting when a potential of approximately 5 volts negative with respect to cathode is applied thereto. This control potential is supplied preferably, from a rectifier circuit 71 energized through a second transformer 72 from the supply lead 53 and a supply lead 73 connected to the main supply lead 16 through the switch 17 in parallel with the input to the power rectifier, so that the bias potential at the terminals 75 and 76 is applied between the grid 70 and the cathode 64 simultaneously with energizing of the R.-F. power generator.

The bias potential is applied to the tube through a connection 77 between the cathode and the positive terminal 76, while a negative terminal 75 is connected through a resistor 78 and a resistor 79 in series, to the grid 70. The resistors 78 and 79 together with the shunt capacitors 80 and 81, and a third resistor 82, provide an R.-F. filter network having an input terminal 83 and a ground terminal 84 through which controlling potentials may be applied to the tube 66 in addition to the fixed biasing potential provided by the source 71. The control potential terminal 83 is also designated by the reference letter A to indicate the input end of the "Thyratron" control circuit.

In the present system, the terminal 83 is connected through a lead 85 selectively to either one of the resistors 23 or 24 in the cathode circuit of the oscillator through the intermediary of a selector switch 86 having a contact 87 and a contact 88, respectively connected with an adjustable contact 89 on the resistor 23, and an adjustable contact 90 on the resistor 24.

The two phase or reversible capacitor motor is energized to operate in a direction to reduce the impedance of the reactance device 12 in the circuit when the power switch 17 is closed, since at the same time the contacts 61 are closed by operation of the relay 62, which is connected, as shown, between the leads 53 and 73. This causes the solenoid plunger to rise in the winding, in the arrangement shown, and to close the contacts 61. The motor is then energized through the resistor 60. The oscillator or R.-F. power generator is likewise energized and the load is rapidly built up on the generator at a rate determined by the speed of rotation of the motor and the reduction gearing 44 and the corresponding rate of movement of the control element 40 of the variable reactance 12.

As the load builds up on the oscilaltor, the plate or anode current rises in accordance with the curve 95 which has a linear portion between points 96 and 97 which is chosen as the operating range for the control system.

As the load builds up on the oscillator, the plate anode current increases as shown by variation or increase of the capacity at the reactance 12, and the resultant increased anode current causes an increase in the potential drop through the cathode resistors 23 and 24 through which the anode current is divided. Portions of the potential drop with respect to ground and the biasing potential on the control tube 66 may be selected by the potentiometer connections 89 and 90 and the switch 86, which is shown in contact with the terminal 87 and the potentiometer contact 89. When the voltage between the contact 89 and ground exceeds a predetermined potential in opposition to the hold-off potential from the source 71, the grid 70 of the tube 66 is driven to a predetermined firing potential which may be any desired potential, either negative or positive with respect to the cathode, depending upon the construction of the tube. At the predetermined potential, the tube will fire or conduct current, thereby simultaneously energizing the winding 47 when the limit switch 45 is closed, and since the current path through the tube 66 is of lower impedance than that through the resistor 60, a preponderance of energy is provided through the winding 47 with respect to the winding 48 and the motor reverses and operates in the opposite direction at a relatively slow rate, since it is retarded by the current through the winding 48 and gradually opens the capacitor 12, that is, increases the impedance to current flow and unloads the generator, thereby reducing the current through the load and the heating effect.

When the load is sufficiently reduced such that the oscillator anode current is below a value sufficient to provide a potential drop at the grid 70 greater than the firing potential, the tube 66 will stop conducting on the next half cycle of anode voltage and will thereafter remain open in accordance with its characteristic. At this point the motor again reverses and travels in the opposite direction to decrease the reactance at 12 and to again increase the load. The above described cycle then repeats when the load current rises again sufficiently to fire the tube 66. In this manner, an average load current is applied to the load over a period of time as may be required to heat a given load or batch of material at 10. The load may be fixed or moving as may be desired.

The voltage derived from the oscillator cathode circuit is proportional to the plate current and may be adjusted as shown to provide any desired potential on the control tube 66 so that the load may increase only slightly or to any desired extent before the tube 36 operates, depending upon the adjustment of the contacts 89 and 90.

The contacts 89 and 90 are preferably set to two different levels so that by switching from the contact 87 to the contact 88, a change in power output of the system may be provided substantially instantly for changing over from the heating of one kind of material to the heating of another kind, or in changing from one thickness of material to another, whereby a desired amount of power is applied to the work to effect the desired treatment in a given time.

A controlling potential may be applied to the control tube 66 from any other suitable control point with respect to the load through other voltage supply connections to the point A, that is to the terminal 83. For example, the output circuit of the oscillator or the load circuit of the system may be modified for this purpose as shown in Figure 3, to which attention is now directed, and in which like elements throughout are indicated by the same reference characters as in Figure 1.

In Figure 3, the output circuit 6—7 is connected to the load 10 through the electrodes 8 and 9 and the series variable reactance 12, as in the preceding example. The voltage, however, for controlling the tube 66 is derived from the output or load circuit, which is coupled to a capacitor divider circuit comprising two series connected capacitors 100 and 101 across the output circuit and load. Parallel paths between a tap point 102 between the capacitors and ground, are provided through a choke coil 103 and a resistor 104 in one path, and through a rectifier 105 and a second resistor 106 in the other path. Thus, the circuit 103—104 provides a path for one half of the alternating current wave resulting from the potential derived from the terminal 102 with respect to ground 11, whereas the path 105—106 provides rectification for the opposite half wave of the alternating current energy applied to the terminal 102 by the capacity divider network 100—101. A bypass capacitor 107 is provided across the resistor 106 and a potentiometer contact 108 is provided thereon in connection with a potential supply lead 109 which is connected with the terminal 83 at A (Figure 1) to apply potential to the tube 66 in response to voltage variations in the load.

With this arrangement it will be seen that, depending upon the polarity of the rectifier 105, a potential of the desired polarity and magnitude may be applied to the lead 109 for firing the tube 66 at a desired adjustable maximum voltage level across the load circuit 6—7, whereupon the regulator motor reverses and reduces the voltage, the operation being otherwise the same as described for Figure 1.

In the one case, the control voltage for the regulator tube 66 is derived from a resistor or a pair of resistors in the cathode circuit of the oscillator tube being thereby responsive to anode current variations, whereas in the modification shown in Figure 3, the voltage controlling the tube 66 is proportional to the output load voltage which is thereby maintained substantially constant.

Therefore, the system provides means whereby the average anode current of the oscillator may be maintained substantially constant independently of changes which may occur in the load, and since the output power is proportional to the anode current of the oscillator, the average power dissipated in the load is thereby held substantially constant. In the modification, the average load voltage is maintained substantially constant regardless of load impedance variations. Therefore, as the temperature or moisture content of a dielectric body to be treated varies under treatment, the system operates to maintain either the energy applied or the voltage applied to the load at substantially a constant average value.

It will be noted that the circuits of Figures 1 and 3 provide safety features which prevent overrunning of the control motor with respect to the control element 12, whereby the operation of the motor may be interrupted at the end of the movement of the control element 40. In the present example the limit switch 45 operates to open the circuit between the tube 66 and the motor winding 47 when the capacitor 12 or other impedance device is all the way open or at a maximum impedance for minimum load or voltage conditions.

Likewise when the power switch 17 is opened to de-energize the power generator and the oscillator, it will be noted that the transformer 72 is likewise de-energized along with the relay 62, thereby cutting off the hold-off biasing potential on the regulator tube 66 and opening the contact 61. Under such conditions, with or without any biasing potential from the oscillator circuit, the biasing potential on the grid 70 of the control tube 66 is reduced to such a value that the tube fires and current is conducted through the tube 66 and the winding 47 without the braking effect of the winding 48, thereby bringing the reactance of the device 12 to a minimum value at a rapid rate until the limit switch 45 operates to stop the motor. The system is then in a condition to receive any charge or load and to build up the load rapidly from a low value upon closure of the switch.

Thus the system has the advantage of applying the load current of voltage gradually, whereby a higher operating potential may be attained and a more efficient heating may be effectuated than would be possible with the rapid application of a fixed potential to the load, and without the danger of flash-over or burning of the material. Furthermore, by proper choice of the resistance value of the resistor 60 with respect to the biasing potential at 71, the amplitude of oscillation of the power control system may be held to less than five per cent of the total load current, so that the load varies substantially not more than five per cent above and below a fixed value, as the motor oscillates between two limits in operation, as indicated for example, by the points 96 and 97 on the curve 95 of Figure 2.

Furthermore, the system is adapted for treating various types of dielectric material. For example, Bakelite powder as a load 10 may require a constant power input for effective heating of the material, whereas wood containing a large percentage of moisture initially may have a load requirement calling for constant voltage at the load, as the power factor changes with a reduction in the moisture content, thereby to prevent over-heating of the material after drying. Both of these conditions and others are readily met by the flexible operation and effective control provided by the load control system of the present invention.

It will be noted, furthermore, that the loading is accomplished at reduced speed and the use of reversing relays is entirely eliminated by the present system.

The variable reactance 12 in the load circuit may not necessarily be a variable capacitor in all cases. In some cases it may be desirable to utilize a variable inductance to control the load as, for example, when the load circuit is used for induction heating. Such a modification of the circuit of Figure 1 is indicated in Figure 4, wherein the oscillator output coupling inductance 32 is provided with a low impedance secondary or coupling winding 110, to which is connected, through output leads 111 and 112, a work coil 113 in the form of a fractional or multiple turn conductor as may be required. This coil is connected with the leads 111 and 112 in any suitable manner and is adapted to surround a work piece such as a metal rod 114, shown in cross section, within the work coil.

The variable reactance in the present modification comprises a tubular inductance unit 115 in the form of an open U-shaped conductor having parallel sides connected at their ends 116 and 117 with the terminals of the circuit serially in the lead 112, so that the inductance unit or element 115 is included serially between the power source or secondary 110, and the load or work coil 113. A movable short circuiting bar 118 is connected with the operating connection 41 for the motor and is moved in trombone fashion along the conductor 115, to vary the effective inductive length thereof in the load circuit and the load current to the work load. As the system is otherwise operated and is the same as shown in Figure 1, no further description is deemed to be necessary for this modification.

While the invention has been shown and described in a present preferred embodiment and modifications thereof, it is obvious that it may be embodied in other forms for the control of R.-F. power to a load circuit, whereby any desired load characteristic may be maintained substantially constant in response to variations in the load impedance or variations in other load characteristics effecting the power applied to the load.

I claim as my invention:

1. A control system for controlling the output to a variable load by an R.-F. power generator coupled to said load by a variable impedance, said system comprising a reversible motor operatively connected to said variable impedance to control the amplitude thereof, means for energizing said motor, a first motor control circuit for operating said motor in a direction to decrease said variable impedance connecting said energizing means to said motor, a second motor control circuit for operating said motor in a direction to increase said variable impedance connecting said energizing means to said motor, said first motor control circuit including an impedance determining resistor in series with said energizing means, said second motor control circuit including an electron discharge tube having its discharge path in series with said energizing means, the value of said resistor being selected to determine the impedance of said first motor control circuit as greater than the impedance of said second motor control circuit when said tube is energized whereby when both motor control circuits are energized said motor operates to decrease said variable impedance, said electron discharge tube having a grid circuit to determine the conductivity of said tube, means to apply a first potential to said grid circuit to maintain said tube nonconducting, means to derive for predetermined values of output of said R.-F. power generator a second potential having a value to cause said tube to become conducting, and means to apply said second potential to said grid circuit whereby said variable impedance device is varied to maintain a desired output to said load.

2. A control system for an electronic power generator having an output load circuit including a variable reactance device to control said power generator output, said control system comprising an electric motor operatively connected to said variable reactance device, said electric motor having two reversing windings, first control circuit means including a resistor in series with one of said windings for operating said motor at a predetermined speed in a direction to increase the value of said variable reactance device, said first control circuit means also including in series with said one winding normally open switch means which are closed responsive to excitation of said electronic power generator, second control circuit means including an electron discharge tube having its discharge path in series with the other of said windings for operating said motor at a second predetermined speed to decrease the value of said variable reactance device, said second control circuit means also including limit switch means in series with said other winding and being operative to open responsive to said variable reactance device being operated to its maximum value, said electron discharge tube having a control grid circuit, means to apply a first potential to said control grid circuit while said power generator is excited to maintain said tube non-conducting, means to derive for predetermined power generator output values a second potential having a value to cause said tube to become conducting, and means to apply said second potential to said control grid circuit whereby said variable reactance device is varied to maintain a substantially constant average load upon said power generator despite variations in load impedance and upon deenergization of said power generator, said variable reactance device is varied to have its maximum value.

3. A system for controlling the power applied to a variable impedance load from an R.-F. power oscillator coupled to said load through a variable power control impedance, said system comprising a reversible motor operatively connected to said variable impedance to decrease said impedance when operated in one direction and to increase said impedance when operated in the other didirection, said motor having a first winding the excitation of which operates said motor in said one direction and a second winding the excitation of which operates said motor in said other direction, means to energize said motor, a resistor connected between said energizing means and said first winding to limit said motor speed in said one direction, an electron discharge tube connected in series between said energizing means and said second winding to control said motor operation in said other direction, said tube having a control grid circuit to which a first potential is applied to maintain said tube non-conducting, means responsive to the power applied to said load exceeding a predetermined level to derive a second potential, and means to apply said second potential to said control grid circuit to oppose said first potential to cause said tube to become nonconducting whereby said motor is operated to increase said variable impedance to return said power applied to said load to said predetermined level.

4. A system for controlling the output applied to a variable impedance load from an R.-F. power oscillator coupled to said load through a variable power control impedance, said system comprising a reversible motor operatively connected to said variable impedance to decrease said impedance when operated in one direction and to increase said impedance when operated in the other direction, said motor having a first winding the excitation of which operates said motor in said one direction and a second winding the excitation of which operates said motor in said other direction, a pair of connections to which energy for said motor is applied, said first and second windings having one of their ends connected to one of said connections, an impedance determining resistor coupling the other end of said first winding to the other of said connections, an electron discharge tube having an anode, cathode and control grid electrode said anode being coupled to the other end of said second winding, said cathode being connected to said other of said pair of connections, means to apply a first potential to said control grid electrode to maintain said tube non-conducting, means to derive a second potential responsive to the output applied to said load exceeding a predetermined level, and means to apply said second potential to said control grid to oppose said first potential to cause said tube to become conducting whereby said motor is operated to increase said variable impedance to return said output applied to said load to said predetermined level.

5. The system recited in claim 4 wherein there is also included a relay which is connected between said resistor and said other end of said first winding, said relay being open when not excited, means to energize said first potential applying means and said relay simultaneously with the energization of said R.-F. power oscillator, and limit switch means connecting said tube anode to said other end of said second winding, said limit switch means being operable to open responsive to said variable impedance being operated to its maximum value whereby when said R.-F. oscillator is not energized said variable impedance is at a maximum value and when said R.-F. oscillator is first energized the value of said variable impedance is gradually decreased to a predetermined value.

6. A system as recited in claim 4 wherein said means to derive a second potential responsive to the output applied to said load exceeding a predetermined level includes a plurality of potentiometric means in the cathode circuit of said R.-F. oscillator, each of said potentiometric means having a slider which is positioned differently on each of said potentiometers to provide a second potential for different levels of power being applied to said load, and selector switch means to select the slider which provides a second potential at a desired power level.

7. A system as recited in claim 4 wherein said means to derive a second potential responsive to the output applied to said load exceeding a predetermined level includes a pair of capacitors connected in series across said load, an R.-F. choke, a resistor connected in series with said choke, a rectifier, a potentiometer connected in series with said rectifier, said choke and said rectifier being also connected to the connection between said two series connected capacitors, said resistor and said potentiometer having their free ends connected together, said potentiometer having a slider which is positioned to provide a second potential when the voltage across said load exceeds a predetermined value.

LESTER S. LAPPIN.

REFERENCES CITED

The following references are of record in the file of this patent:

UNITED STATES PATENTS

| Number | Name | Date |
|---|---|---|
| 2,368,582 | Sziklai | Jan. 30, 1945 |
| 2,416,172 | Gregory | Feb. 18, 1947 |
| 2,428,702 | Elliot | Oct. 7, 1947 |
| 2,470,443 | Mittelman | May 17, 1947 |
| 2,491,822 | Livingston | Dec. 20, 1949 |
| 2,508,752 | Drugmond | May 23, 1950 |